UNITED STATES PATENT OFFICE.

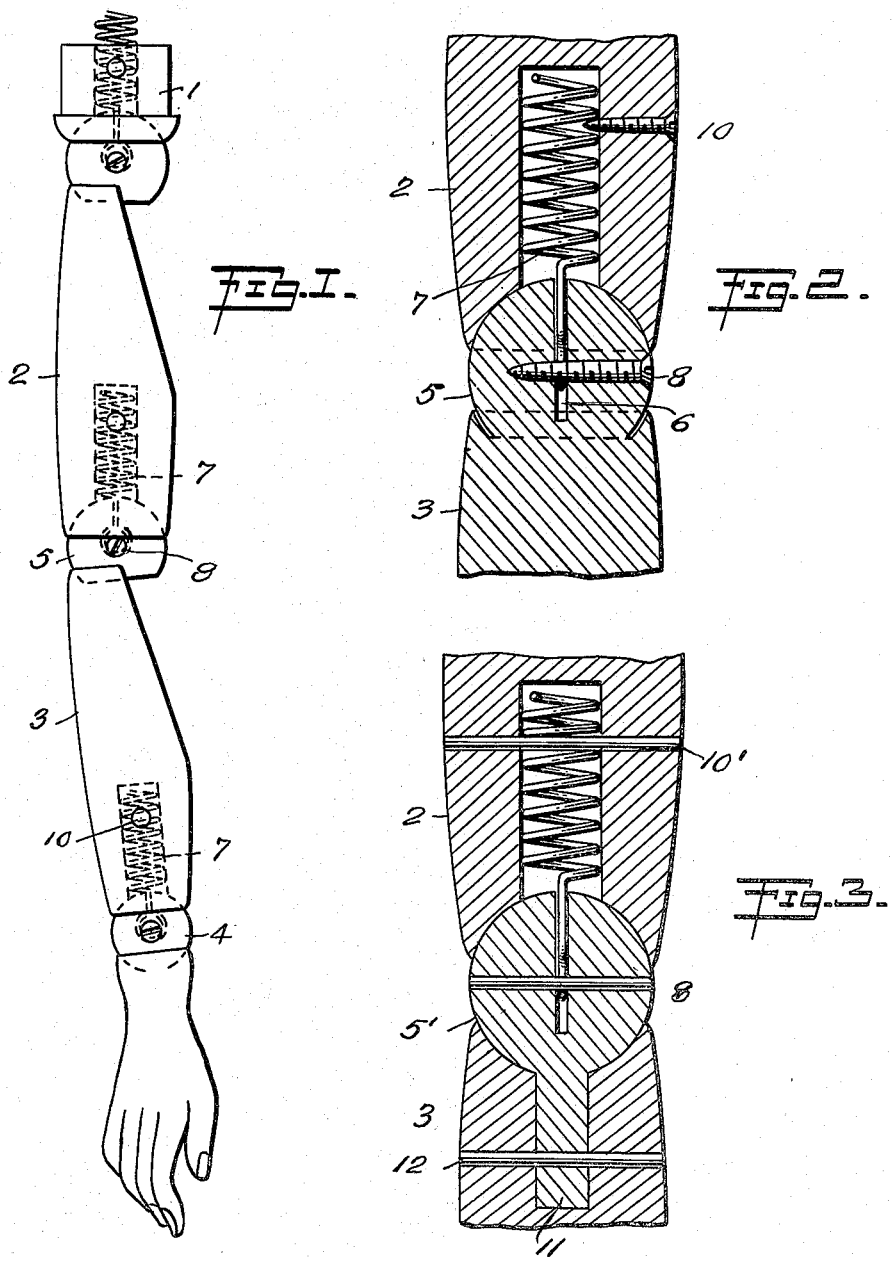

LOUIS WULKAN, OF NEW YORK, N. Y., ASSIGNOR TO WULKAN & GLASS, OF NEW YORK, N. Y., A FIRM.

ARTIFICIAL LIMB FOR DISPLAY-FIGURES.

No. 924,521.  Specification of Letters Patent.  Patented June 8, 1909.

Application filed January 22, 1909. Serial No. 473,648.

*To all whom it may concern:*

Be it known that I, LOUIS WULKAN, a citizen of the United States, and resident of the city, county, and State of New York, have invented certain new and useful Improvements in Artificial Limbs for Display-Figures, of which the following is a specification.

This invention relates to artificial limb construction for display figures and more particularly to the construction of the joints.

The object of the invention is to provide a simple and cheap construction for the joint which shall permit movement in every direction and also to provide a simple means of adjustment for the same.

In the drawing accompanying this specification like parts in the several views have been given the same reference numbers.

Figure 1 is a side elevation for a complete arm. Fig. 2 is an enlarged sectional view of the elbow joint. Fig. 3 is an enlarged sectional view, similar to Fig. 2, showing a modification of the joint construction.

At the upper portion of the arm a member 1 is provided for attaching the same to the body of the display figure. The upper arm portion is shown at 2 and the lower arm portion at 3. At the lower end of the arm a member 4 is provided to which the hand is attached. Between these several arm members a joint is provided which permits movement in every direction. This is in the nature of a ball and socket joint and is of similar construction at the three different points in the arm where relative movement is to be provided for.

The description of the construction of the elbow joint, shown more in detail in Fig. 2, will suffice for all of the joints.

At one end of the lower arm member 3, a spherical or ball shaped portion 5 is formed. This ball shaped portion is provided with a slot 6 in which is mounted one end of a resilient member or spring 7 by means of a suitable pivotal attachment, such as a pin 8, which permits the lower arm to be swung about said pivot. The adjacent end of the upper arm member 2 is provided with a socket, the shape conforming to the ball member 5 on the lower arm member 3. There is also provided a recess 9 to receive the coiled portion of the spring 7. Projecting into this recess 9 is a pin or screw 10, in such a manner as to engage the convolutions of the spring 7.

On account of the ball and socket construction just described it will be seen that the lower arm member 3 may be rotated relatively to the upper arm or socket member 2 and as the spring 7 is attached to the lower arm member 3 the same will be rotated therewith. The convolutions of the spring engaging the pin 10 will thus cause the same to be tightened or loosened as the same is rotated and by this means any desired degree of tightness or adjustment may be secured between the upper and lower arm members 2 and 3.

In Fig. 3 a similar construction is shown, except that the ball member 5' is formed from a separate piece and provided with a projection 11 by means of which it is secured to the lower arm member 3 by a pin 12 or other suitable fastening. In the upper arm member 2 a pin 10', extending entirely through the same and through the recess 9, may be provided instead of the screw 10, shown in Fig. 2, if desired.

It will thus be seen that the construction herein described provides a simple means of holding the members in operative engagement while permitting relative movement between the same in any direction. Adjustment between the members is secured in a simple manner and a construction provided which accomplishes the desired results and which may be easily and cheaply manufactured.

As many changes could be made in the above construction and many apparently widely different embodiments designed without departing from the scope of the appended claims, I intend that all matter contained in the above description or shown in the accompanying drawing shall be interpreted as illustrative merely of an operative embodiment of my invention and not in a limiting sense.

What I claim is:

1. In a joint for artificial limbs, in combination, an arm member provided with a spherical portion at one end thereof, an arm member provided with a socket at one end thereof, said socket being formed to receive said spherical portion, a coil spring attached to one of said arm members, and an engaging member carried by the other of said arm members arranged and adapted to progressively engage the successive convolutions of said spring and to cause the same to operate as a screw for adjusting said arm members when relatively rotated.

2. In a device of the character described, a joint comprising two complementary arm members, a coil spring attached to one of said arm members and extending into the other arm member, the joint between said members being a rotatable universal joint, means extending between and engaging the convolutions of said spring so that when said joint is rotated the convolutions of said spring are progressively and successively engaged, causing said arm members to be adjustably and resiliently held in engagement.

Signed at New York, county and State of New York, this 21st day of January, 1909.

LOUIS WULKAN.

Witnesses:
 A. W. SOUTHARD,
 B. W. COULDOCK.